(12) United States Patent
Jung et al.

(10) Patent No.: US 11,910,015 B2
(45) Date of Patent: Feb. 20, 2024

(54) METHOD AND DEVICE FOR MULTI-VIEW VIDEO DECODING AND METHOD AND DEVICE FOR IMAGE PROCESSING

(71) Applicant: ORANGE, Issy-les-Moulineaux (FR)

(72) Inventors: Joel Jung, Chatillon (FR); Pavel Nikitin, Chatillon (FR); Patrick Boissonade, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/678,356

(22) Filed: Feb. 23, 2022

(65) Prior Publication Data

US 2022/0182671 A1  Jun. 9, 2022

Related U.S. Application Data

(63) Continuation of application No. 17/052,342, filed as application No. PCT/FR2019/050892 on Apr. 16, 2019, now Pat. No. 11,290,746.

(30) Foreign Application Priority Data

May 3, 2018 (FR) ........................ 1853829

(51) Int. Cl.
*H04N 19/597*   (2014.01)
*H04N 19/70*    (2014.01)
*H04N 19/172*   (2014.01)
*H04N 19/44*    (2014.01)
*H04N 19/119*   (2014.01)
*H04N 19/124*   (2014.01)

(52) U.S. Cl.
CPC ........... *H04N 19/597* (2014.11); *H04N 19/70* (2014.11)

(58) Field of Classification Search
None
See application file for complete search history.

(56) References Cited

U.S. PATENT DOCUMENTS

| 9,414,047 | B2 | 8/2016 | Norkin et al. |
| 9,762,903 | B2 | 9/2017 | Chen et al. |

(Continued)

FOREIGN PATENT DOCUMENTS

| CN | 10266561 A  | 9/2012 |
| CN | 104365105 A | 2/2015 |

(Continued)

OTHER PUBLICATIONS

International Search Report dated Nov. 26, 2019 for corresponding International Application No. PCT/FR2019/050892, filed Apr. 16, 2019.

(Continued)

*Primary Examiner* — Christopher Braniff
(74) *Attorney, Agent, or Firm* — David D. Brush; Westman, Champlin & Koehler, P.A.

(57) ABSTRACT

A method and a device for decoding a data stream representative of a multi-view video. Syntax elements are obtained from at least one part of the stream data, and used to reconstruct at least one image of a view of the video. Then, at least one item of metadata in a predetermined form is obtained from at least one obtained syntax element, and provided to an image processing module. Also, a method and a device for processing images configured to read the at least one item of metadata in the predetermined form and use it to generate at least one image of a virtual view from a reconstructed view of the multi-view video.

10 Claims, 4 Drawing Sheets

(56) References Cited

U.S. PATENT DOCUMENTS

| | | |
|---|---|---|
| 2010/0165077 A1 | 7/2010 | Yin et al. |
| 2011/0096832 A1 | 4/2011 | Zhang et al. |
| 2012/0269275 A1 | 10/2012 | Hannuksela |
| 2013/0322531 A1 | 12/2013 | Chen et al. |
| 2014/0192165 A1 | 7/2014 | Norkin et al. |
| 2014/0314147 A1 | 10/2014 | Rusanovskyy et al. |
| 2015/0341614 A1 | 11/2015 | Senoh et al. |
| 2020/0322584 A1 | 10/2020 | Aizawa et al. |

FOREIGN PATENT DOCUMENTS

| | | |
|---|---|---|
| JP | 2014-132721 A | 7/2014 |
| JP | 2014-528190 A | 10/2014 |
| JP | 2017-212592 A | 11/2017 |
| WO | 2010010077 A2 | 1/2010 |
| WO | 2013025151 A1 | 2/2013 |

OTHER PUBLICATIONS

Written Opinion of the International Searching Authority dated Nov. 26, 2019 for corresponding International Application No. PCT/FR2019/050892, filed Apr. 16, 2019.

Jacek Konieczny et al. "Depth-based inter-view prediction of motion vectors for improved multiview video coding", 3DTV-Conference: The True Vision—Capture, Transmission and Display of 3D Video (3DTV-CON), 2010, IEEE, Piscataway, NJ, USA, Jun. 7, 2010 (Jun. 7, 2010), pp. 1-4 XP031706347.

Notice of Allowance dated Nov. 23, 2021 from the USPTO, for corresponding U.S. Appl. No. 17,052,342, filed Nov. 2, 2020.

Series H: Audiovisual and multimedia systems—Infrastructure of audio visual services—Coding of moving video, High Efficiency Video Coding, Recommendation ITU-T H.265, International Telecommunication Union, Dec. 2016.

Wegner et al., "Enhanced View Synthesis Reference Software (VSRS) for Free-viewpoint television", ISO/IEC JTC1/SC29/WG11 m31520, Oct. 2013, Geneva, Switzerland.

Office Action dated Jun. 1, 2021 from the USPTO, for corresponding U.S. Appl. No. 17,052,342, filed Nov. 2, 2020.

Office Action dated Feb. 16, 2023, from the United States Patent and Trademark Office for corresponding U.S. Appl. No. 17/678,364, filed Feb. 23, 2022.

Notice of Allowance and Fees Due (PTOL-85) dated Jul. 5, 2023, from the United States Patent and Trademark Office for corresponding U.S. Appl. No. 17/678,364, filed Feb. 23, 2022.

Notification of the First Office Action dated Jun. 28, 2023 from the China National Intellectual Property Administration for corresponding Chinese Application No. 201980029982.8, filed Apr. 16, 2019.

Japanese Notice of Reasons for Refusal dated Apr. 25, 2023 for corresponding parallel Japanese Application No. 2021-510551.

Non-Final Rejection dated Sep. 11, 2023, from the United States Patent and Trademark Office for corresponding U.S. Appl. No. 17/678,376, filed Feb. 23, 2022.

METHOD AND DEVICE FOR MULTI-VIEW VIDEO DECODING AND METHOD AND DEVICE FOR IMAGE PROCESSING

1. CROSS-REFERENCE TO RELATED APPLICATIONS

This application is continuation of U.S. patent application Ser. No. 17/052,342, filed Nov. 2, 2020, which is a Section 371 National Stage Application of International Application No. PCT/FR2019/050892, filed Apr. 16, 2019, which published as WO 2019/211541 A2 on Nov. 7, 2019, not in English, the contents of which are incorporated by reference in their entireties.

2. FIELD OF THE INVENTION

The present invention relates generally to the field of 3D image processing, and more specifically to the decoding of sequences of multi-view images and the synthesis of images of intermediate views.

3. PRIOR ART

In the field of virtual reality, free navigation allows the viewer to view a scene from any point of view, whether that point of view corresponds to a point of view captured by a camera or a point of view that has not been captured by a camera. Such a view that has not been captured by the camera is also referred to as virtual view or intermediate view because it lies between views captured by the camera and must be synthesised for restitution.

Free navigation in a scene requires that every movement of the user viewing the multi-view video is managed correctly, and that the discomfort the viewer can feel when the images are not rendered optimally is avoided.

In general, the movement of the user is correctly taken into account by the restitution devices, for example an HMD (Head Mounted Device) virtual reality headset.

However, providing the correct pixels for display, regardless of the movement of the user (rotation or translation) remains problematic. Indeed, the calculation of the images to be displayed requires the use of several captured views to display additional images of virtual (i.e. synthesised) views. Such virtual views correspond to points of view that have not been captured by a camera. It is then necessary to calculate them from the decoded captured views and the associated depths.

Consequently, a codec offering a free navigation functionality must be effective for encoding several views and associated depths and allow an optimal rendering of virtual views, i.e. requiring the use of a synthesis algorithm to be displayed.

Multi-view video encoders designed to encode multi-view sequences, such as the standard MV-HEVC or 3D-HEVC (Series H: Audiovisual and multimedia systems—Infrastructure of audio visual services—Coding of moving video, High Efficiency Video Coding, Recommendation ITU-T H.265, International Telecommunication Union, December 2016) are known.

The MV-HEVC encoder applies a very basic inter-view prediction, while the 3D-HEVC encoder includes several additional tools to take advantage not only of the temporal redundancies, but also of the inter-view redundancies. In addition, 3D-HEVC has specific tools for an efficient encoding of the depth maps. These two codecs, and in particular 3D-HEVC, effectively reduce the bit rate when encoding several views with associated depths, compared to a conventional video codec handling 2D video sequences, such as the HEVC standard.

In a virtual reality context, after decoding the views that have been captured by cameras and encoded into a data stream, virtual views can be synthesised based for example on the movements of the user.

For example, the VSRS tool (Wegner, Stankiewicz, Tanimoto, Domanski, *Enhanced view synthesis reference software (VSRS) for free-viewpoint television*, ISO/IEC JTC1/SC29/WG11 m31520, October 2013, Geneva, Switzerland) is known for synthesising such virtual views.

Figure 1:
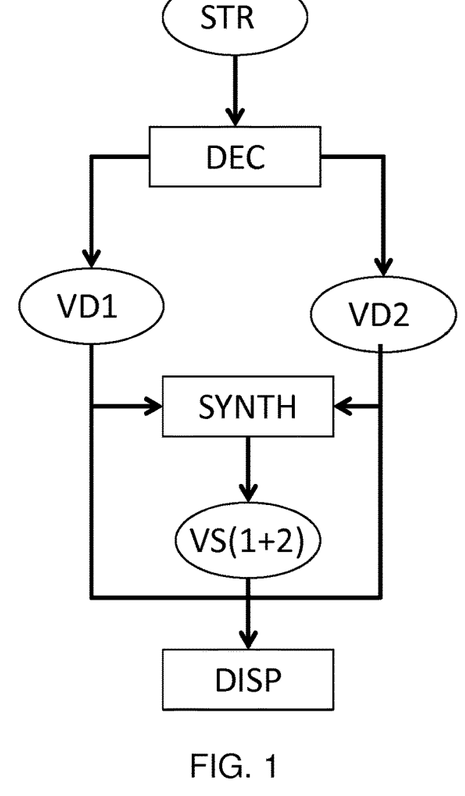
FIG. 1 diagrammatically illustrates a system for free navigation within a multi-view video according to the prior art, FIG. 2 diagrammatically illustrates a decoder of a data stream representative of a multi-view video according to the prior art, FIG. 3 diagrammatically illustrates a system for free navigation within a multi-view video according to a particular embodiment of the invention.

FIG. 1 illustrates a conventional free navigation system in which a decoder DEC (for example, 3D-HEVC) decodes a data stream STR to produce decoded views (VD1, VD2). Such views are then used by a view synthesiser SYNTH (for example, VSRS) to produce synthesised views VS(1+2). Decoded views and synthesised views are then displayed by a restitution device DISP according to the movement of the user.

Figure 2:
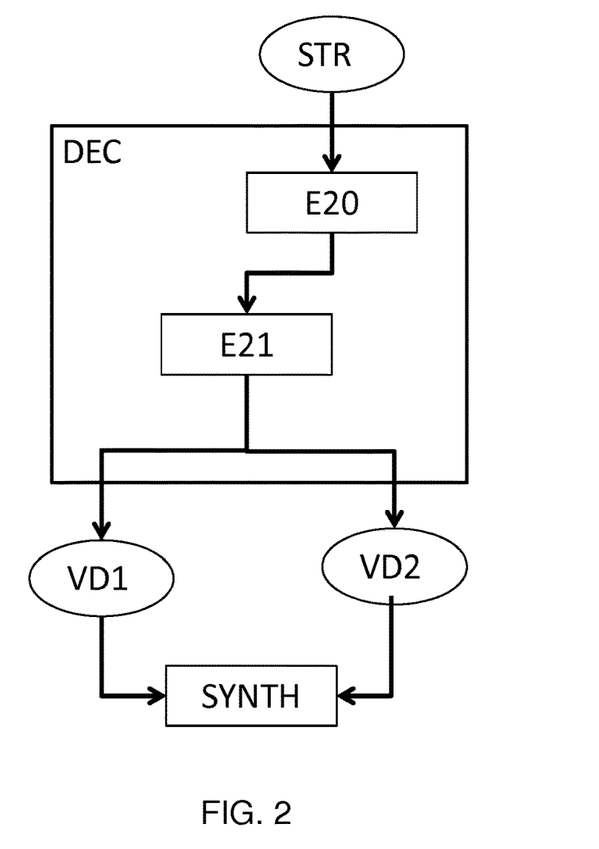

A conventional decoder DEC is illustrated in FIG. 2. Typically, such a decoder performs the analysis (E20) of the data stream STR to obtain the relevant data to be decoded, then applies the decoding process (E21) to reconstruct the decoded views (VD1, VD2) that can then be used by the synthesis module SYNTH to generate virtual views.

It thus appears that the process for decoding views from a data stream and the process for synthesising virtual views are not correlated. In particular, the synthesis process is a difficult task in which the decoder is not involved. The decoder simply makes decoded views reconstructed from the data stream available to the synthesis module.

A technical problem faced by virtual reality applications is that the encoder and the decoder have no a priori knowledge of the final point of view required by the user, particularly in the case of free navigation. The multi-view video encoder and decoder even have no knowledge of the synthesis process that will finally be used to synthesise virtual views. Indeed, the synthesis method used to synthesise virtual views is currently not standardised, unlike the multi-view video decoder, so that a synthesis method used by virtual reality applications remains a proprietary tool.

Therefore, the quality of the synthesised virtual views depends on the synthesis tools and the synthesis algorithm used by such applications. In general, such quality depends on the complexity of the synthesis tools used and on the resources of the devices implementing these synthesis tools.

Virtual reality applications, and more particularly those using free navigation, must be real time. Virtual view synthesis modules generally provide virtual views of medium quality, particularly when the number of captured and decoded views is insufficient, even when the decoded and reconstructed captured views are of high visual quality.

4. SUMMARY OF THE INVENTION

The invention improves the state of the art.

It relates to a method for decoding a data stream representative of a multi-view video, implemented by a decoding device, comprising obtaining syntax elements from at least one part of the stream data, and reconstructing at least one image of a view of the video from the obtained syntax elements. Advantageously, the decoding method further comprises obtaining at least one item of metadata in a predetermined form from at least one syntax element, and providing said at least one item of metadata to an image processing module.

Such a decoding method thus enables to provide to an image processing module, for example a synthesis module external to the decoder, metadata representative of data of the video stream and that can be used by the image processing module. The process implemented within the image processing module is thus less complex. For example, in the case of a virtual view synthesis module, it is not necessary to recalculate some of the data that is used by the synthesis algorithm and that is available from the decoder. Moreover, the invention also enables the image processing module to access data that it would not be able to calculate by itself and to use it to improve its operation. For example, in the case of a virtual view synthesis module, the decoder can provide an occlusion map to the synthesis module, such occlusions being difficult to determine by the synthesis module from only the reconstructed images of a view of the video.

The process implemented within the image processing module can thus be improved, because the operational complexity for obtaining data that is available at the decoder level being reduced, more complex, and therefore more powerful, image processing algorithms, can then be more easily implemented within the image processing module.

In the case of a virtual view synthesis module, the quality of the virtual views is thus improved. This also enhances the free navigation of a user in a multi-view video by providing smoother transitions between views. Moreover, improving the synthesis of virtual views also reduces the number of cameras required to capture the scene.

Providing the metadata in a predetermined format facilitates the communication between the decoder and the image processing module. For example, the metadata is provided in the form of an indexed and standardised table. The image processing module thus knows for each index in the table which metadata is stored at this index.

It is known to use metadata for video data communications. For example, SEI (Supplemental Enhancement Information) messages, introduced with the H.264/AVC standard, are data relating to optional processing operations implemented at the decoder level. The SEI messages are sent to the decoder via the video data bitstream. However, such SEI message data is created at the encoder level and is used only by the decoder, optionally, to improve the quality of the decoded and reconstructed views.

According to a particular embodiment of the invention, obtaining at least one item of metadata further comprises calculating said at least one item of metadata from at least one part of the syntax elements.

Such a particular embodiment of the invention makes it possible to calculate new metadata, corresponding for example to information that is not used by the decoder to reconstruct a view, for example a confidence value calculated for depth information, or to information that is used by the decoder in another form, for example motion information with a coarser granularity than the one used when reconstructing an image.

According to another particular embodiment of the invention, said at least one item of metadata is not used for reconstructing the at least one image.

According to another particular embodiment of the invention, said at least one item of metadata corresponds to one item of information included in the group comprising:
   camera parameters,
   decoded and scaled motion vectors,
   a partitioning of the reconstructed image,
   a reference image used by a block of an image of the reconstructed view,
   the coding modes of an image of the reconstructed view,
   quantization parameter values of an image of the reconstructed view,
   prediction residual values of an image of the reconstructed view,
   a map representative of the movement in an image of the reconstructed view,
   a map representative of the presence of occlusions in an image of the reconstructed view,
   a map representative of confidence values associated with a depth map.

According to another particular embodiment of the invention, the predetermined form corresponds to an indexed table in which at least one item of metadata is stored in association with an index.

According to another particular embodiment of the invention, said at least one item of metadata is obtained based on a granularity level specified in the decoding device.

According to this particular embodiment of the invention, the metadata generated from the syntax elements can be obtained at different granularity levels. For example, for motion information, the motion vectors can be provided with the granularity used at the decoder (i.e. as used by the decoder), or with a coarser granularity (for example by providing one motion vector per block of size 64×64).

According to another particular embodiment of the invention, the decoding method further comprises receiving by the decoding device a request from the image processing module indicating at least one item of metadata required by the image processing module. According to this particular embodiment of the invention, the image processing module indicates to the decoder the information it needs. The decoder can thus make only the required metadata available to the image processing module, which limits the complexity at the decoder and the use of memory resources.

According to another particular embodiment of the invention, the request comprises at least one index indicating the required item of metadata among a predetermined list of available metadata.

The invention also relates to a decoding device configured to implement the decoding method according to any one of the particular embodiments defined above. This decoding device could, of course, comprise the different characteristics relating to the decoding method according to the invention. Thus, the characteristics and advantages of this decoding device are the same as those of the decoding method, and they are not detailed further. According to a particular embodiment of the invention, such a decoding device is comprised in a terminal, or a server.

The invention also relates to an image synthesis method comprising generating at least one image of a virtual view, from at least one image of a view decoded by a decoding device. According to the invention, such an image processing method also comprises reading at least one item of metadata in a predetermined form, said at least one item of metadata being obtained by the decoding device from at least one syntax element obtained from a data stream representative of a multi-view video, said at least one image being generated using said at least one read item of metadata.

Thus, the image synthesis method takes advantage of the metadata available to the decoder to generate images of a virtual view of the multi-view video. Such metadata can correspond to data to which the image processing device does not have access, or to data that it is able to recalculate, but at the cost of a high operational complexity.

Virtual view here means a view from a new point of view of the scene for which no sequence of images has been captured by a camera of the scene acquisition system.

According to a particular embodiment of the invention, the image synthesis method further comprises sending to the decoding device a request indicating at least one item of metadata required to generate the image.

The invention also relates to an image processing device configured to implement the image processing method according to any one of the particular embodiments defined above. This image processing device could, of course, comprise the different characteristics relating to the image processing method according to the invention. Thus, the characteristics and advantages of this image processing device are the same as those of the image processing method, and they are not detailed further.

According to a particular embodiment of the invention, such an image processing device is comprised in a terminal, or a server.

The invention also relates to an image processing system for displaying a multi-view video from a data stream representative of the multi-view video, comprising a decoding device according to any one of the embodiments described above, and an image processing device according to any one of the embodiments described above.

The decoding method, respectively the image processing method, according to the invention can be implemented in various ways, notably in wired form or in software form. According to a particular embodiment of the invention, the decoding method, respectively the image processing method, is implemented by a computer program. The invention also relates to a computer program comprising instructions for implementing the decoding method or the image processing method according to any one of the particular embodiments previously described, when said program is executed by a processor. Such a program can use any programming language. It can be downloaded from a communication network and/or recorded on a computer-readable medium.

This program can use any programming language, and can be in the form of source code, object code, or intermediate code between source code and object code, such as in a partially compiled form, or in any other desirable form.

The invention also relates to a computer-readable storage medium or data medium comprising instructions of a computer program as mentioned above. The recording media mentioned above can be any entity or device able to store the program. For example, the medium can comprise a storage means, such as a ROM, for example a CD-ROM or a microelectronic circuit ROM, a USB flash drive, or a magnetic recording means, for example a hard drive. On the other hand, the recording media can correspond to a transmissible medium such as an electrical or optical signal, that can be carried via an electrical or optical cable, by radio or by other means. The program according to the invention can be downloaded in particular on an Internet-type network.

Alternatively, the recording media can correspond to an integrated circuit in which the program is embedded, the circuit being adapted to execute or to be used in the execution of the method in question.

5. LIST OF FIGURES

Other characteristics and advantages of the invention will emerge more clearly upon reading the following description of particular embodiments, provided as simple non-restrictive illustrative examples, and the annexed drawings, wherein:

FIG. 4 illustrates steps of the method for decoding a data stream representative of a multi-view video according to a particular embodiment of the invention, FIG. 5 diagrammatically illustrates a decoder of a data stream representative of a multi-view video according to a particular embodiment of the invention.

6. DESCRIPTION OF PARTICULAR EMBODIMENTS OF THE INVENTION

The invention is based on modifying the decoding process of a data stream representative of a multi-view video, so that an image processing process based on views reconstructed by the decoding process is facilitated. For example, the image processing process corresponds to a process for synthesising virtual views. For this purpose, the decoder provides not only images of views reconstructed from the data stream, but also metadata associated with such images, that can then be used for the synthesis of virtual views. Advantageously, such metadata is formatted, i.e. put into a predetermined form to facilitate interoperability between the decoder and the synthesiser. Thus, any synthesiser configured to read the metadata in the predetermined form can be used to synthesise virtual views.

Figures 3, 4:
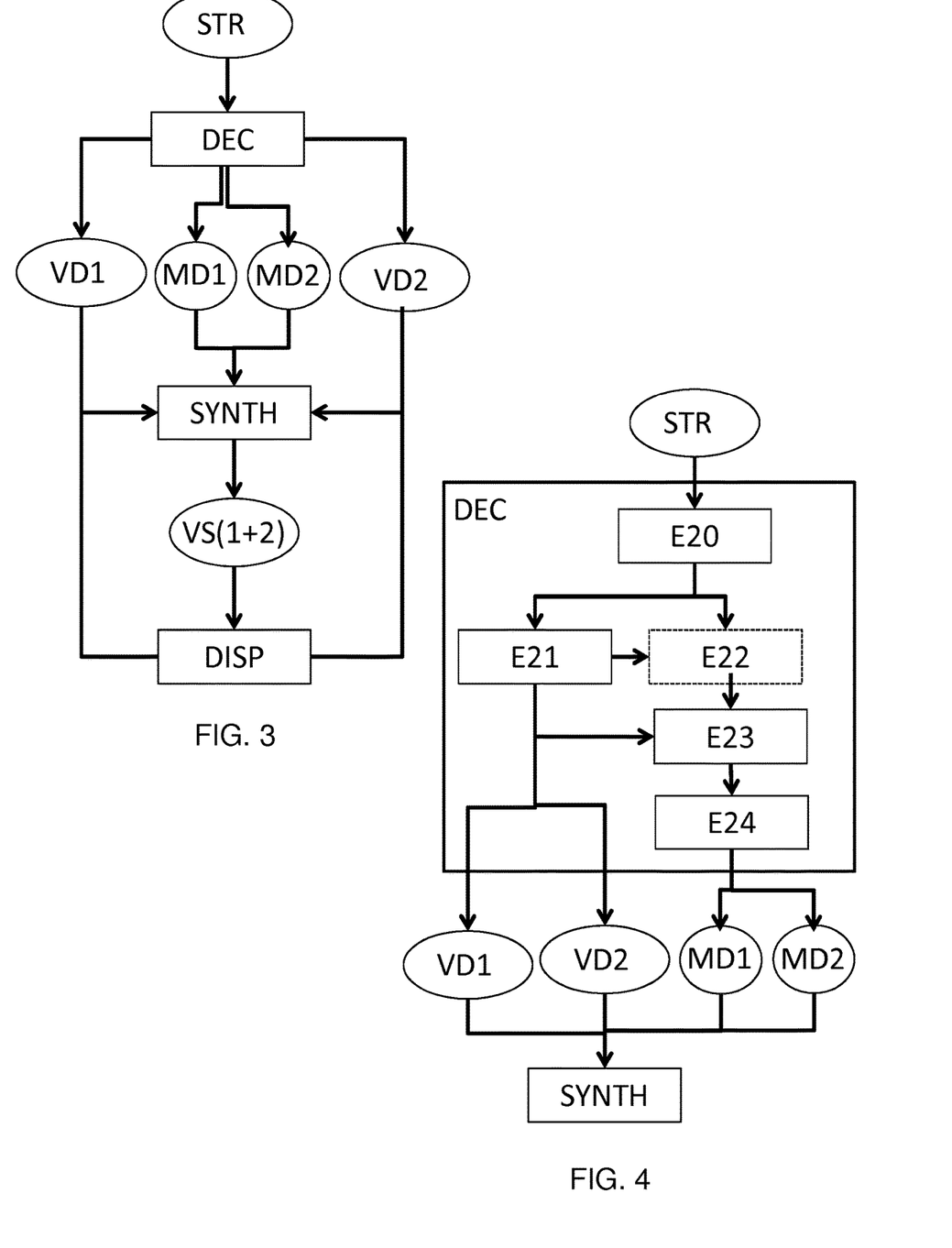

FIG. 3 diagrammatically illustrates a system for free navigation within a multi-view video according to a particular embodiment of the invention. The system in FIG. 3 operates similarly to the system described in relation to FIG. 1, with the difference that the decoder DEC provides metadata MD1, MD2 at the output in addition to the images of reconstructed views VD1 and VD2. Such metadata MD1, MD2 is provided at the input to the synthesiser, that then generates a virtual view VS(1+2), for example from reconstructed views VD1, VD2.

The decoder DEC and the synthesiser SYNTH then form an image processing system according to the invention. They can be included in the same apparatus or in two separate devices able to communicate with each other.

For example, in a non-restrictive and non-exhaustive manner, such metadata can correspond to:

camera parameters of the view reconstructed by the decoder, decoded and scaled motion vectors of the image reconstructed by the decoder, a partitioning of the reconstructed image, an indication of reference images used by blocks of the reconstructed image, coding modes of the reconstructed image, quantization parameter values of the reconstructed image, prediction residual values of the reconstructed image.

Such information can be provided as used by the decoder. Alternatively, such information can be processed by the decoder, for example to be provided with a finer or coarser granularity than the one used by the decoder.

Metadata can also be calculated and shared by the decoder, for example:

a map representing the general motion in an image of the reconstructed view, or in a group of images; for example, such a map can be a binary map obtained by thresholding the motion vectors of the image or group of images, a map representative of the presence of occlusions in an image of the reconstructed view; for example such a map can be a binary map obtained by considering the level of information contained in the prediction residuals of each pixel in the case of an inter-view prediction, or the information of a possible location of occlusions can be derived from the disparity vectors of the image or from an edge map, a map representative of confidence values associated with a depth map; for example, such a map can be computed by the decoder by comparing the coding modes of the texture and the corresponding depth.

Some of the output metadata can be data relating to a single view: it is then intrinsic to the view. Other metadata can be obtained from two or more views. In this case, the metadata is representative of a difference or of a correlation between the views (camera parameters, occlusion map, difference in decoding modes, etc.).

FIG. 4 illustrates steps of the method for decoding a data stream representative of a multi-view video according to a particular embodiment of the invention.

A data stream STR is supplied at the input of the decoder DEC, for example as a bitstream. The data stream STR comprises, for example, data of the multi-view video encoded by a video encoder according to the prior art adapted for the encoding of multi-view video using the redundancies between frames or by a single-view video encoder applied to each view of the multi-view video individually.

In a step E20, the decoder DEC decodes at least one part of the stream data providing decoded syntax elements. Such a decoding E20 corresponds, for example, to a path of the data stream and to an entropy decoding of the bit stream in order to extract the syntax elements required to reconstruct a current image of a view to be reconstructed, for example a view viewed by a user. Such syntax elements correspond, for example, to the coding modes of the blocks of the current image, to the motion vectors in the case of an inter-image or inter-view prediction, to the quantized coefficients of the prediction residuals, etc. Classically, during step E21, the current image of a view (VD1, VD2) to be reconstructed is reconstructed from the decoded syntax elements and possibly from the images of the view or of other previously reconstructed views. Such a reconstruction of the current image is implemented according to the coding modes and prediction techniques used at the encoder level to encode the current image.

The images of reconstructed views are provided at the input of an image processing module SYNTH.

In a step E23, at least one item of metadata is obtained from at least one decoded syntax element. Such an item of metadata is formatted in a predetermined form. Such a predetermined form corresponds, for example, to a particular syntax according to which the data is arranged to be transmitted or stored in memory. When the multi-view video decoder is a decoder compliant with a particular standard, the syntax of the metadata can, for example, be described in that particular standard or a standard associated with the particular decoding standard.

According to a particular embodiment of the invention, the predetermined form corresponds to an indexed table in which at least one item of metadata is stored in association with an index. According to this particular embodiment, each metadata type is associated with an index. An example of such a table is illustrated in table 1 below.

TABLE 1

Example of a metadata table

| Index | Metadata type |
|---|---|
| 0 | camera parameters |
| 1 | motion vectors |
| 2 | image partitioning |
| 3 | reference images of the blocks of the image |
| 4 | encoding modes of the blocks of the image |
| 5 | quantization parameters of the blocks of the image |
| 6 | prediction residual values of the blocks of the image |
| 7 | motion map of the image |
| 8 | global motion map on a group of images |
| 9 | occlusion map |
| 10 | depth map |
| 11 | confidence map for the depth map |

Each item of metadata is stored in association with its index, and in an appropriate format according to the metadata type.

For example, the camera parameters of a view are stored as a triplet of data comprising respectively location information corresponding for example to the coordinates of the point in the 3D coordinate system corresponding to the location of the camera in the scene, orientation information defined for example by the values of 3 angles in the 3D coordinate system, and a depth of field.

According to another example, the motion vectors are stored in the form of a table comprising for each block of the corresponding reconstructed image the value of the corresponding motion vector.

The metadata table illustrated below is only a non-restrictive example. The metadata can be stored in other predetermined forms. For example, when only one metadata type is possible, it is not necessary to associate an index with the metadata type.

According to a particular embodiment of the invention, in a step E22, at least one item of metadata is calculated from at least one part of the decoded syntax elements, before the obtaining step E23.

Such a particular embodiment of the invention thus makes it possible to obtain metadata that is not used to reconstruct the current image of the view to be reconstructed but that can be used to synthesise virtual views from the reconstructed current image, for example an occlusion map.

Such a particular embodiment of the invention also makes it possible to obtain metadata with a granularity that is different from the one used to reconstruct the current image. For example, the motion vectors can be calculated in a coarser manner, for example for blocks of size 64×64 pixels over the entire image, from the reconstructed motion vectors of all the sub-blocks of the current image contained in the 64×64 block. For example, for each 64×64 block, a motion vector is calculated by taking the minimum or maximum value, a mean or median, or any other function, of the motion vectors of the sub-blocks.

In a step E24, the metadata MD1, MD2 obtained in step E23 is provided to the image processing module SYNTH external to the decoder DEC, for example a virtual view synthesis module. A module external to the decoder means a module which operation is not necessary for decoding the data stream nor for displaying the views reconstructed by the decoder.

For example, the metadata is stored in a memory accessible to the image processing module. According to another example, the metadata is transmitted to the image processing module via a connection link, such as a data transmission bus, when the decoder and the image processing module are integrated in the same apparatus, or via a cable or wireless connection, when the decoder and the image processing module are integrated in separate devices.

Figure 5:
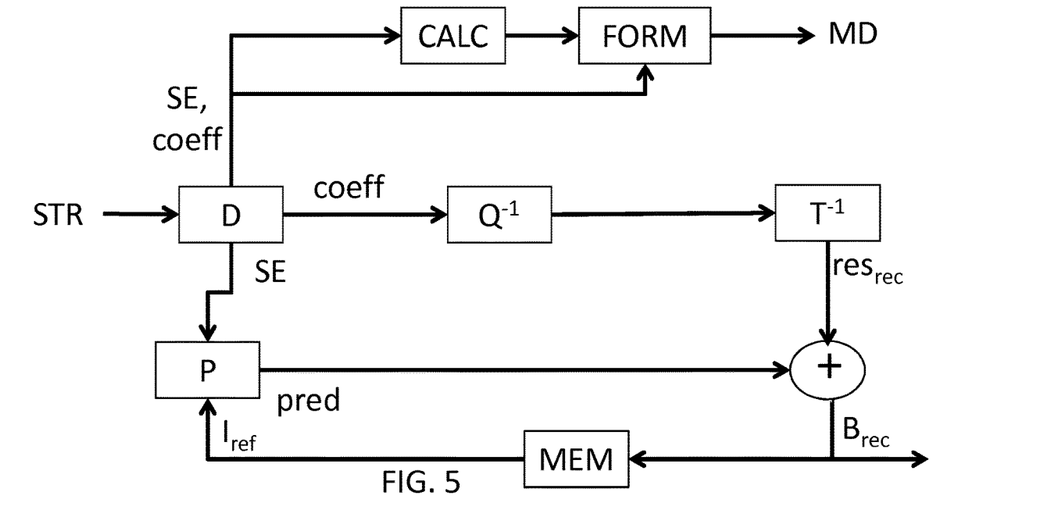

FIG. 5 diagrammatically illustrates a decoder of a data stream representative of a multi-view video according to a particular embodiment of the invention.

Classically, the decoding of a view to be reconstructed from a data stream STR is implemented as follows. The decoding of a view to be reconstructed is done image by image, and for each image, block by block. For each block to be reconstructed, the elements corresponding to the block are decoded by an entropy decoding module D from the data stream STR, providing a set of decoded syntax elements SE (texture encoding mode, motion vectors, disparity vectors, depth encoding mode, reference image index, . . . ) and quantized coefficients coeff.

The quantized coefficients coeff are transmitted to an inverse quantization module ($Q^{-1}$) and then to an inverse transformation module ($T^{-1}$) to provide prediction residual values of the block $res_{rec}$. The decoded syntax elements (SE) are transmitted to a prediction module (P) to calculate a predictor block pred also using a previously reconstructed image $I_{ref}$ (one part of the current image, or a reference image of the previously reconstructed view, or a reference image of another previously reconstructed view). The current block is then reconstructed ($B_{rec}$) by adding the prediction pred to the prediction residuals of the block $res_{rec}$. The reconstructed block ($B_{rec}$) is then stored in memory MEM to be used later to reconstruct the current image or another image or another view.

According to the invention, at the output of the entropy decoding module, the decoded syntax elements SE and optionally the quantized coefficients of the blocks are transmitted to a module FORM configured to select at least one part of the decoded syntax elements SE and optionally the quantized coefficients, and store them in the predetermined form to provide metadata MD relating to the reconstructed image, or to a group of images.

The selection of the decoded syntax elements SE to be formatted can be fixed, for example explicitly set out in the standard describing the operation of the decoder. Alternatively, different types of selection can be defined in a fixed manner, for example via decoder profiles, and a parameterisation of the decoder can configure it so that the formatting module FORM selects the corresponding syntax elements. According to yet another variant, the decoder is able to exchange with the image processing module to which it provides the metadata. In this case, the image processing module explicitly indicates to the decoder the type of metadata it wants to receive and the module FORM of the decoder selects only the required decoded syntax elements.

When metadata can be provided at a granularity level that is different from the one used by the decoder, such a granularity level can be defined in a fixed manner in the standard describing the operation of the decoder, or via decoder profiles. When the image processing module communicates with the decoder to obtain metadata, the image processing module can explicitly indicate to the decoder the granularity level at which it wants to receive some of the metadata.

According to a particular embodiment of the invention, the decoded syntax elements SE and optionally the quantized coefficients at the output of the entropy decoding module are transmitted to a module CALC configured to calculate metadata from the syntax elements SE and/or the quantized coefficients. As before, the metadata to be calculated can be explicitly defined in the standard describing the operation of the decoder, according to different profiles or not, or determined from exchanges with the image processing module for which it is intended.

According to a particular embodiment of the invention, the module FORM selects, in particular, the camera parameters of the view to be reconstructed.

In order to synthesise a new point of view, a synthesis module must create a model describing how each pixel of an original (reconstructed) view is projected into the virtual view. Most synthesisers, for example based on the DIBR (Depth Image Based Rendering) technique, use depth information to project the pixels of the reconstructed view into the 3D space. The corresponding points in the 3D space are then projected into the camera plane from the new point of view.

Such a projection of the image points in the 3D space can be modelled with the following equation: M=K·RT·M', where M is the coordinate matrix of the points in the 3D space, K is the matrix of the intrinsic parameters of the virtual camera, RT is the matrix of the extrinsic parameters of the virtual camera (camera position and orientation in the 3D space) and M' is the pixel matrix of the current image.

If the camera parameters are not transmitted to the synthesis module, the synthesis module has to calculate them at the cost of a high complexity and the accuracy and calculation cannot be done in real time, or have to be obtained by external sensors. Providing these parameters by the decoder thus makes it possible to limit the complexity of the synthesis module.

According to another particular embodiment of the invention, the module FORM selects, in particular, the syntax elements relating to the reference images used to reconstruct the current image.

Figure 10:
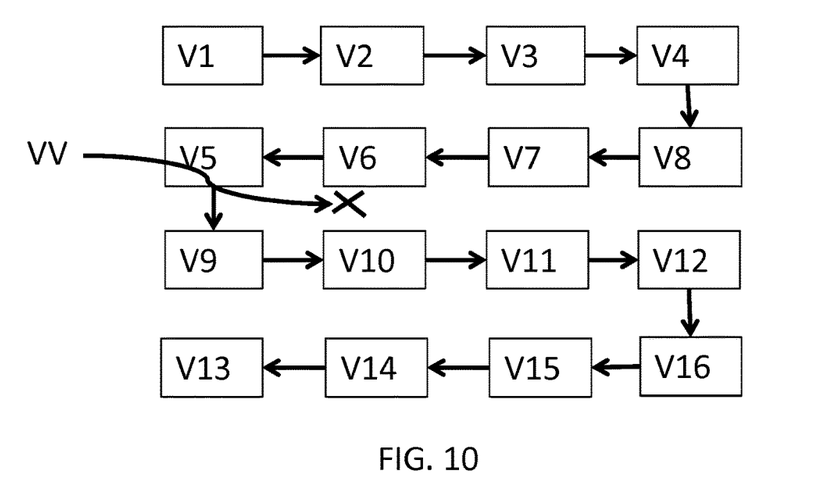
FIG. 10 illustrates an arrangement of views of a multi-view capture system.

In the case where, in order to generate a virtual view, the synthesis module has the possibility of selecting reference images among images of different available and previously reconstructed views, the synthesis module could benefit from knowing which reference views were used when coding a view used for the synthesis. For example, FIG. 10 illustrates an arrangement of views of a multi-view capture system comprising 16 cameras. The arrows between each frame indicate the decoding order of the views. If the synthesis module has to generate a virtual view VV for a point of view placed between view V6 and view V10 (represented by a cross in FIG. 10), classically, the synthesis module has to check the availability of each view, to construct to the best a virtual view.

According to the particular embodiment described here, if the synthesis module has metadata indicating, for a view, the reference views used to reconstruct it, the synthesis module can choose only the available view the closest to the virtual point of view (view V6 in the case of FIG. 10), in order to decide which images to use to generate the virtual view. For example, if blocks of view V6 use an image of view V7 as a reference image, the synthesis module could also decide to use view V7, which is necessarily available since it is used by view V6. Such an embodiment thus reduces the complexity of the synthesis module, by avoiding having to check the availability of each view during the synthesis.

According to another particular embodiment of the invention, the module CALC selects, in particular, the syntax elements relating to the motion vectors to produce a motion map.

In the areas with little movement, the virtual view synthesis generally shows a lack of temporal coherence, due to the imprecision of the depth maps. These incoherencies are extremely disturbing for the visualisation from the virtual point of view.

In this particular embodiment, the module CALC of the decoder selects the decoded and reconstructed motion vectors, i.e. after the inverse prediction of the motion vector and the scaling of the motion vector. The module CALC performs a thresholding of the reconstructed motion vectors of each block to produce a motion map, typically a binary map, in which each element takes the value 0 or 1, indicating locally whether the area has motion or not. The binary map can be improved for example by using mathematical morphology (for example, erosion, expansion, opening, closing).

The motion binary map can then be formatted, depending on the desired granularity (pixel-level map, block or sub-block level map, or map defined for a specific block size in the image, etc.) to indicate whether or not motion is present in the view.

The synthesis module receiving such a motion map can then adapt its operation, for example by applying different synthesis processes depending on whether an area is marked as having motion or not. For example, to solve the problem of temporal incoherence, the conventional synthesis process can be disabled in fixed (motionless) areas and simply inherit the values of the pixels of the previous image.

The synthesis module can of course generate a motion map by itself, using other means, for example by estimating the motion as an encoder. However, such an operation has a significant impact on the complexity of the synthesis algorithm, as well as on the accuracy of the resulting motion, since the encoder estimates the motion from uncoded images that are no longer available at the output of the decoder.

In the example illustrated in FIG. 10 and the embodiment previously described, the valid reference views can be calculated not only using the closest available view, but also by averaging reference views of a neighbourhood of the virtual point of view. For example, the reference views V6, V7, V10 and V11 can be averaged by the module CALC of the decoder and the resulting average view transmitted to the synthesis module.

According to another variant, the module CALC of the decoder can calculate an occlusion map, in which it indicates for each pixel or block of the image whether the area corresponds to an occlusion area. For example, the module CALC can determine whether the area corresponds to an occlusion area by using the information of reference image (s) used by the decoder to reconstruct the area. For example, in the case of FIG. 10, if most of the blocks in the image of the view V6 use time prediction and some blocks in the image of the view V6 use inter-view prediction, for example, relative to view V2, these blocks are likely to correspond to an occlusion area.

The synthesis module receiving such an occlusion map can then decide to apply a different synthesis process depending on whether or not the area is marked as an occlusion area.

According to another particular embodiment of the invention, the module CALC selects, in particular, the coding modes associated respectively with the texture of the reconstructed image and with the depth map of the image.

According to the prior art, the synthesis algorithms mainly use depth maps. Such depth maps usually show errors that produce artefacts in the synthesised virtual views. By comparing the encoding modes between the texture and the depth map, the decoder can derive a confidence measure associated with the depth map, such as a binary map indicating whether depth and texture are correlated (value 1) or not (value 0).

For example, the confidence value can be derived from the encoding modes. If the texture encoding mode and the depth encoding mode are different, for example one in intra mode and the other in inter mode, it means that texture and depth are not correlated. The confidence value will therefore be low, for example, 0.

The confidence value can also be positioned according to the motion vectors. If texture and depth have different motion vectors, it means that texture and depth are not correlated. The confidence value will therefore be low, for example, 0.

The confidence value can also be positioned according to the reference images used by texture and depth. If the reference images are different, it means that texture and depth are not correlated. The confidence value will therefore be low, for example, 0.

The synthesis module receiving such a confidence map can then decide to apply a different synthesis process depending on whether or not the area is marked with a low confidence value. For example, for such areas, another reference view providing a better confidence value for the area can be used to synthesise the corresponding area.

Figure 6:
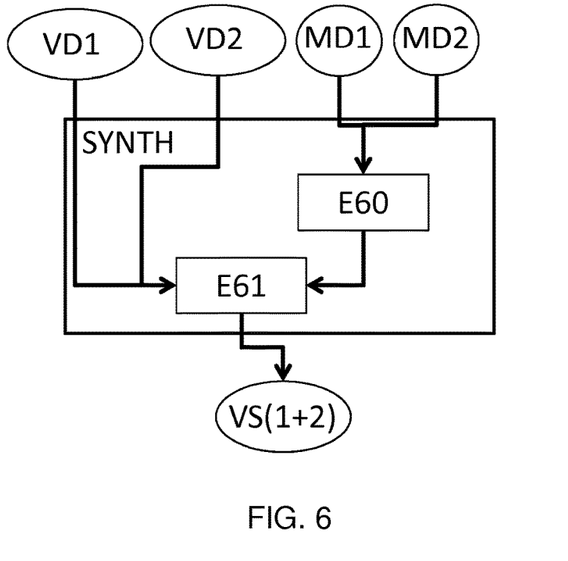
FIG. 6 illustrates steps of the image processing method according to a particular embodiment of the invention.

FIG. 6 illustrates steps of the image processing method according to a particular embodiment of the invention. Such a process is implemented, for example, by a virtual view synthesis module, from views decoded and reconstructed, for example, by the decoding method described in relation to FIG. 5.

In a step E60, at least one item of metadata (MD1, MD2) is read by the synthesis module. The metadata read by the synthesis module corresponds to syntax elements decoded from a stream representative of a multi-view video and is associated with one or more views. It can also correspond to information calculated during the method for decoding the stream from decoded syntax elements. The metadata is stored or transmitted to the synthesis module in a predetermined form, so that any synthesis module having a suitable reading module can read it.

In a step E61, the synthesis module receives at the input at least one image of a view (VD1, VD2) reconstructed by a multi-view video decoder, for example according to the decoding method described in relation to FIG. 5. The synthesis module uses these received views VD1, VD2 and the read metadata MD1, MD2 to generate at least one image from a virtual point of view VS(1+2). In particular, the metadata MD1, MD2 is used by the synthesis module to determine a synthesis algorithm to be used for certain areas of the image, or to determine a view to be used to generate the image of the virtual view . . . .

Figure 7:
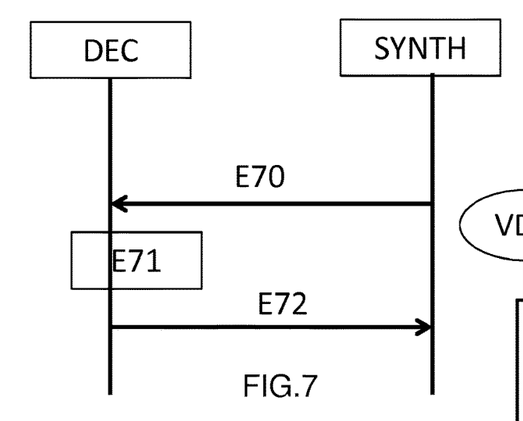
FIG. 7 illustrates steps of the decoding method and the image processing method according to another particular embodiment of the invention, FIG. 8 diagrammatically illustrates a device adapted to implement the decoding method according to a particular embodiment of the invention, FIG. 9 diagrammatically illustrates a device adapted to implement the image processing method according to a particular embodiment of the invention.

FIG. 7 illustrates steps of the decoding method and of the image processing method according to another particular embodiment of the invention.

In general, the decoder of a multi-view video has no knowledge of the type of synthesiser that will be used to generate virtual points of view. In other words, the decoder does not know which synthesis algorithm will be used, nor which metadata types will be useful to it. Depending on the particular embodiment described here, the decoder and the synthesis module are adapted to be able to exchange bi-directionally. For example, the synthesis module can indicate to the decoder a list of metadata it would need to achieve a better synthesis. Before or after the request from the synthesis module, the decoder can inform the synthesis module of the metadata it is able to transmit to it. Advantageously, the list of metadata that the decoder is able to share is standardised, i.e. all the decoders compliant with a decoding standard must be able to share the metadata on the list. Thus, for a given decoding standard, the synthesis module knows which metadata could be available. The list of metadata can also be adapted according to the profile of the decoder standard. For example, for a profile intended for decoders requiring a low operational complexity, the list of metadata only comprises decoded syntax elements of the stream, whereas for a profile intended for decoders able to handle a higher operational complexity, the list of metadata can also comprise metadata obtained by calculation from the decoded syntax elements of the stream, such as motion map, occlusion map, trust map, etc.

In a step E70, the synthesis module transmits to the decoder a request indicating at least one item of metadata required to generate an image from a virtual point of view. For example, the query comprises an index or a list of indexes corresponding respectively to required metadata.

Such a request is transmitted according to a predetermined format, i.e. according to a predetermined syntax so that the synthesis module and the decoder can understand each other. For example, such a syntax can be:

nb for i an integer ranging from 0 to nb−1, list[i]

wherein the syntax element nb indicates the number of metadata required by the synthesis module, and thus the number of indexes to be read by the decoder, and list[i] indicating the respective index of the required metadata.

According to an example, taking the example of the metadata given by the above-mentioned table 1, the synthesis module can indicate in the request nb=2 and the indexes 0 and 9 corresponding respectively to the camera parameters and an occlusion map.

According to a variant, the synthesis module can also indicate, in association with the index of a required item of metadata, a granularity level, for example by specifying a predetermined value of a "grlevel" syntax element associated with the item of metadata. For example, in the case of the occlusion map, the synthesis module can indicate a value 1 for the "level" element associated with the index 9, if it wants the occlusion map at the pixel level, or a value 2 for the "leverl" element associated with the index 9, if it wants the occlusion map at a coarser level, for example for blocks of size 8×8.

In a step E71, the decoder obtains the corresponding metadata. For this purpose, and according to the example described above in relation to FIG. 4 or 5, the decoder retrieves the decoded syntax elements required to obtain the metadata, and calculates the metadata not used by the decoder for the reconstruction, such as the occlusion map. The metadata are then formatted according to the predetermined form for the synthesis module to be able to read it.

In a step E72, the decoder transmits the metadata to the synthesis module, which can then use them in its synthesis algorithm.

Figure 8:
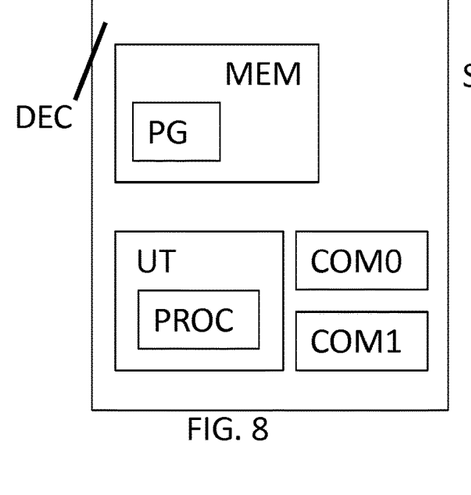

FIG. 8 diagrammatically illustrates a device DEC adapted to implement the decoding method according to a previously described particular embodiment of the invention. Such a decoding device comprises a memory MEM, a processing unit UT, equipped for example with a processor PROC, and controlled by the computer program PG stored in memory MEM. The computer program PG comprises instructions for implementing the steps of the decoding method as described previously, when the program is executed by the processor PROC.

According to a particular embodiment of the invention, the decoding device DEC comprises a communication interface COM0 notably enabling the decoding device to receive a data stream representative of a multi-view video, via a communication network.

According to another particular embodiment of the invention, the decoding device DEC comprises a communication interface COM1 enabling the decoding device to transmit metadata to an image processing device, such as a synthesis module, and images of views reconstructed from the data stream.

At initialisation, the code instructions of the computer program PG are for example loaded into a memory before being executed by the processor PROC. In particular, the processor PROC of the processing unit UT implements the steps of the decoding method described in relation to FIGS. 4, 5 and 7 according to the instructions of the computer program PG. The memory MEM is notably adapted to store the metadata obtained during the decoding method, in a predetermined form.

According to a particular embodiment of the invention, the previously described decoding device is comprised in a terminal, such as a television receiver, a mobile phone (for example, a smartphone), a set top box, a virtual reality headset, etc.

Figure 9:
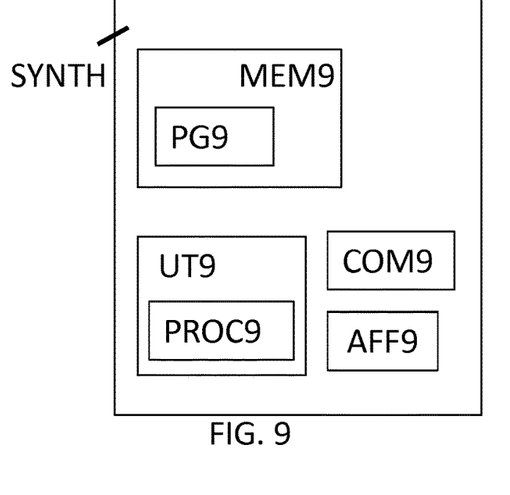

FIG. 9 diagrammatically illustrates a device SYNTH adapted to implement the image processing method according to a previously described particular embodiment of the invention.

Such a device comprises a memory MEM9, a processing unit UT9, equipped for example with a processor PROC9, and controlled by the computer program PG9 stored in memory MEM9. The computer program PG9 comprises instructions for implementing the steps of the image processing method as described previously, when the program is executed by the processor PROC9.

According to a particular embodiment of the invention, the device SYNTH comprises a communication interface COM9 enabling the device to receive metadata originating from a decoding device, such as the device DEC described above, and images of views reconstructed from a data stream representative of a multi-view video, by the device DEC. At initialisation, the code instructions of the computer program PG9 are for example loaded into a memory before being executed by the processor PROC9. In particular, the processor PROC9 of the processing unit UT9 implements the steps of the image processing method described in relation to FIGS. 6 and 7 according to the instructions of the computer program PG9.

According to a particular embodiment of the invention, the device SYNTH comprises an output interface AFF9 enabling the device SYNTH to transmit images to a display device, for example a screen. For example, such images can correspond to images from a virtual point of view, generated by the device SYNTH using images of reconstructed views and metadata received from the device DEC.

According to a particular embodiment of the invention, the device SYNTH is a synthesis module. It is comprised in a terminal, such as a television receiver, a mobile phone (for example, a smartphone), a set top box, a virtual reality headset, etc.

The principle of the invention has been described in the case of a multi-view decoding system, in which several views are decoded from the same stream (bit stream) and metadata is obtained for each view. The principle applies similarly to the case where the multi-view video is encoded using several streams (bit streams), one view per stream being encoded. In this case, each view decoder provides the metadata associated with the view it decodes.

What is claimed is:

1. A decoding method for decoding a data stream representative of a multi-view video, implemented by a decoding device, the method comprising:
   obtaining syntax elements from at least one part of the stream data;
   reconstructing at least one image of a view of the video from the syntax elements obtained;
   receiving a request from an image synthesis module indicating at least one item of metadata required by the image synthesis module, said at least one item of metadata being associated with said at least one reconstructed image, and said at least one item of metadata corresponding to camera parameters representative of a location of at least one camera in a scene;
   obtaining the at least one item of metadata from at least one syntax element; and
   providing said at least one item of metadata to the image synthesis module, said image synthesis module being configured to synthesize at least one virtual view, distinct from the views of the multi-view video, from said at least one reconstructed image and said at least one item of metadata.

2. The decoding method according to claim 1, wherein obtaining at least one item of metadata further comprises calculating said at least one item of metadata from at least one part of the syntax elements.

3. The decoding method according to claim 1, wherein said at least one item of metadata is not used for reconstructing the at least one image.

4. The decoding method according to claim 1, wherein the metadata are obtained in a predetermined form corresponding to an indexed table in which at least one item of metadata is stored in association with an index.

5. The decoding method according to claim 1, wherein said at least one item of metadata is obtained based on a granularity level specified in the decoding device.

6. The decoding method according to claim 1, wherein the request comprises at least one index indicating the required item of metadata among a predetermined list of available metadata.

7. A device for decoding a data stream representative of a multi-view video, wherein the device comprises:
   a processor; and
   a non-transitory computer-readable medium comprising instructions stored thereon which, when executed by the processor configure the decoding device to:
   obtain syntax elements from at least one part of the stream data;
   reconstruct at least one image of a view of the video from the syntax elements obtained;
   receive a request from an image synthesis module indicating at least one item of metadata required by the image synthesis module, said at least one item of metadata being associated with said at least one reconstructed image, and said at least one item of metadata corresponding to camera parameters representative of a location of at least one camera in a scene;
   obtain the at least one item of metadata from at least one syntax element; and
   provide said at least one item of metadata to the image synthesis module, said image synthesis module being configured to synthesize at least one virtual view, distinct from the views of the multi-view video, from said at least one reconstructed image and said at least one item of metadata.

8. An image synthesis method implemented by a synthesis device, the method comprising:
   generating at least one image of a virtual view, from at least one image of a view of a multi-view video decoded by a decoding device, said virtual view being distinct from views of the multi-view video, by:
   sending to the decoding device a request indicating at least one item of metadata required to generate the at least one image of a view, said at least one item of metadata being associated with said at least one image of a view, and said at least one item of metadata corresponding to camera parameters representative of a location of at least one camera in a scene;
   reading the at least one item of metadata, said at least one item of metadata being obtained by the decoding device from at least one syntax element obtained from a data stream representative of a multi-view video; and
   generating said at least one image of a virtual view comprising using said at least one read item of metadata and said decoded image.

9. An image synthesis device configured to generate at least one image of a virtual view, from at least one image of a view of a multi-view video decoded by a decoding device, said virtual view being distinct from views of the multi-view video, the image synthesis device comprising:
   a processor; and
   a non-transitory computer-readable medium comprising instructions stored thereon which when executed by the processor configure the image synthesis device to:
   send to the decoding device a request indicating at least one item of metadata required to generate the at least one image of a view, said at least one item of metadata being associated with said at least one image of a view, and said at least one item of metadata corresponding to camera parameters representative of a location of at least one camera in a scene;
   read the at least one item of metadata, said at least one item of metadata being obtained by the decoding device from at least one syntax element obtained from a data stream representative of a multi-view video; and
   generate said at least one image using said at least one read item of metadata and said decoded image.

10. A non-transitory computer-readable medium comprising a computer program stored thereon comprising instructions for implementing a decoding method when said program is executed by a processor of a decoding device, wherein the instructions configure the decoding device to:
   decode a data stream representative of a multi-view video by:

obtaining syntax elements from at least one part of the stream data;

reconstructing at least one image of a view of the video from the syntax elements obtained;

receiving a request from an image synthesis module indicating at least one item of metadata required by the image synthesis module, said at least one item of metadata being associated with said at least one reconstructed image, and said at least one item of metadata corresponding to camera parameters representative of a location of at least one camera in a scene;

obtaining the at least one item of metadata from at least one syntax element; and providing said at least one item of metadata to the image synthesis module, said image synthesis module being configured to synthesize at least one virtual view, distinct from the views of the multi-view video, from said at least one reconstructed image and said at least one item of metadata.

* * * * *